(12) United States Patent
Walter et al.

(10) Patent No.: US 9,863,485 B2
(45) Date of Patent: Jan. 9, 2018

(54) BEARING HAVING A WEAR RING

(71) Applicants: Philippe Walter, Fondettes (FR);
Benoit Arnault, Saint-Cyr-sur-Loire (FR)

(72) Inventors: Philippe Walter, Fondettes (FR);
Benoit Arnault, Saint-Cyr-sur-Loire (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/158,054

(22) Filed: May 18, 2016

(65) Prior Publication Data

US 2016/0348739 A1   Dec. 1, 2016

(30) Foreign Application Priority Data

May 25, 2015   (FR) ...................................... 15 54665

(51) Int. Cl.
*F16C 43/04*   (2006.01)
*F16D 23/14*   (2006.01)
*F16C 35/06*   (2006.01)

(52) U.S. Cl.
CPC ............ *F16D 23/148* (2013.01); *F16C 35/06* (2013.01); *F16C 43/04* (2013.01); *F16D 23/146* (2013.01); *F16C 2226/12* (2013.01)

(58) Field of Classification Search
CPC ...... F16C 19/163; F16C 33/586; F16C 43/08; F16C 43/086; F16D 23/146; F16D 23/147
See application file for complete search history.

(56) References Cited

U.S. PATENT DOCUMENTS 4,094,394 A * 6/1978 Koder ..................... F16D 23/14
192/110 B

FOREIGN PATENT DOCUMENTS

| DE | 3410116 A1 | 10/1985 | |
|---|---|---|---|
| DE | 102006040463 A1 | 3/2008 | |
| FR | 2347571 A1 | 11/1977 | |
| FR | 2887312 A1 | 12/2006 | |
| FR | 3008458 A1 | 1/2015 | |
| WO | WO 2008025633 A1 * | 3/2008 | ........... F16D 23/143 |
| WO | WO 2008058816 A1 * | 5/2008 | ........... F16D 23/146 |
| WO | WO 2012153161 A1 * | 11/2012 | ........... F16D 23/146 |

* cited by examiner

*Primary Examiner* — Phillip A Johnson
(74) *Attorney, Agent, or Firm* — Bryan Peckjian; SKF USA Inc. Patent Dept.

(57) ABSTRACT

The bearing provides a first bearing ring, a second hearing ring and a wear ring attached to the first bearing ring. The wear ring provides at least one hook cooperating with the first bearing ring for the axial retention of the wear ring relative to the first bearing ring. The first hearing ring further provides at least one centering member projecting into and engaging within a complementarily shaped recess of the wear ring, for angular locking of the wear ring relative to the first bearing ring.

9 Claims, 5 Drawing Sheets

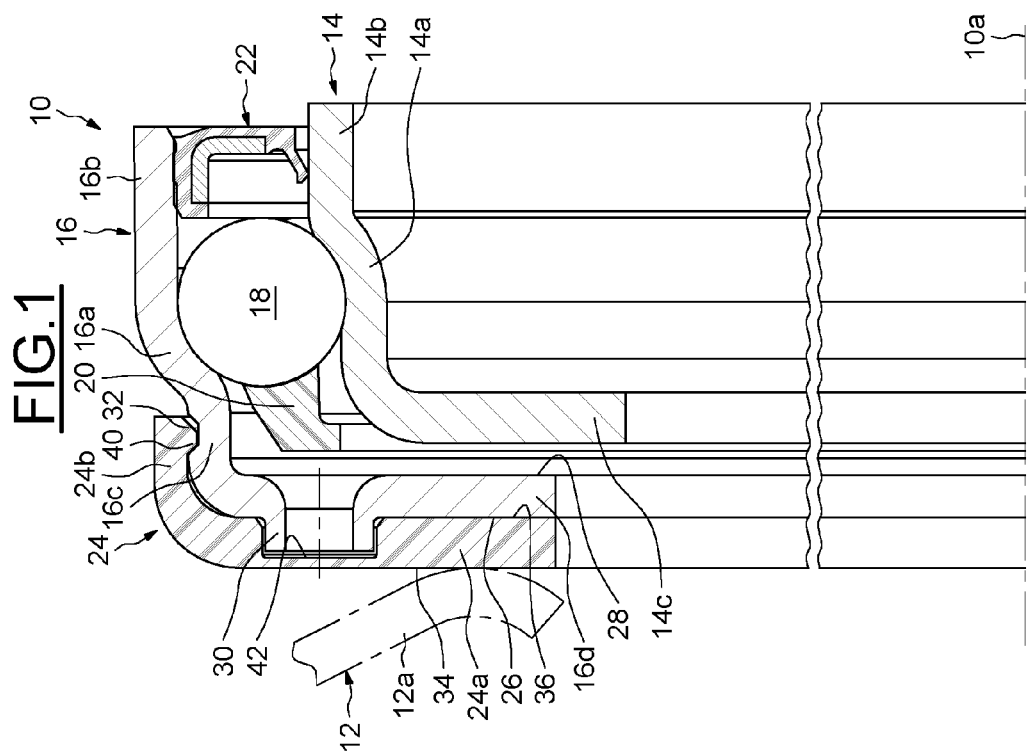

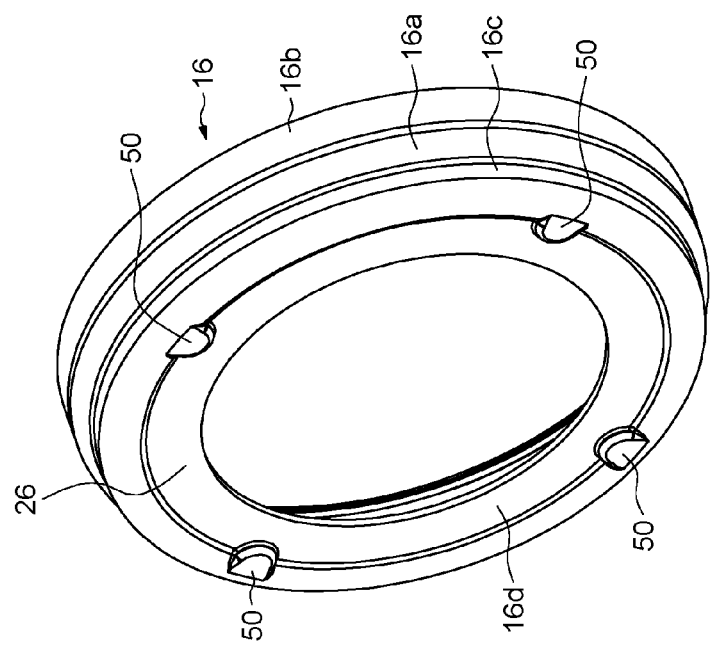
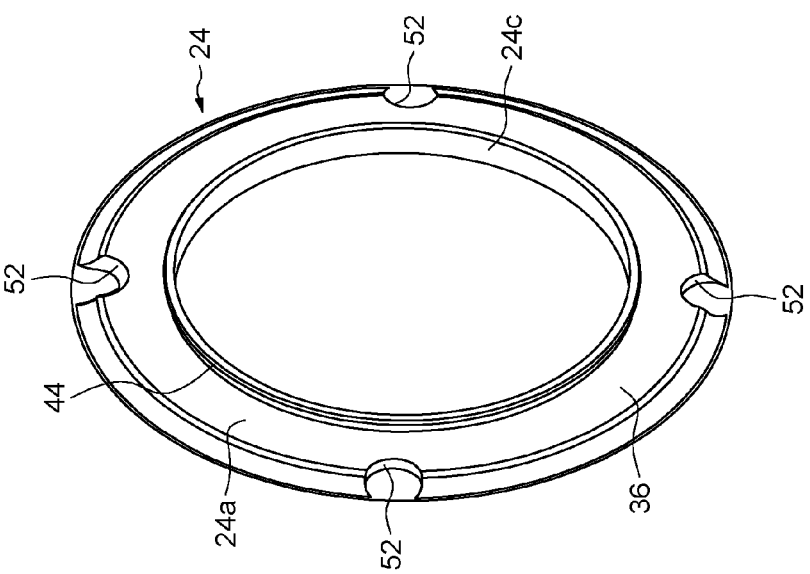

BEARING HAVING A WEAR RING

CROSS-REFERENCE TO RELATED APPLICATIONS

This application claims priority to French patent application no. 1554665 filed on May 25, 2015, the contents of which are fully incorporated herein by reference.

FIELD OF THE INVENTION

The present invention relates to the field of rolling bearings, in particular the rolling bearings used in the clutch release devices intended to act on the diaphragm of a clutch, in particular for a motor vehicle.

BACKGROUND OF THE INVENTION

Such devices provide a rolling bearing of which one of the rings is rotatable and the other is fixed, the rotary ring being provided with a radial engagement surface intended to come into contact with the end of the diaphragm fingers of the clutch.

A non-rotating operating element supports the rolling bearing, and, under the action of a control member (mechanical, electrical or hydraulic), moves the bearing in an axial direction so as to press the engagement surface of the rotary ring against the diaphragm of the clutch and actuate the clutch mechanism.

In order to limit wear by friction between the fingers of the diaphragm and the rotating ring during disengagement and clutch manoeuvres, it is possible to fix on the rotating race a wear ring of polymeric material. For details on such a wear ring, one can for example refer to the patent application FR-A1-2 887 312.

In the bearing described in this prior art document, a holding plate is provided on the rotating ring to ensure the retention of the wear ring on the rotating ring. However, this solution has the disadvantage of increasing the number of components of the bearing to be manufactured, stored and assembled.

The present invention aims to overcome this disadvantage.

SUMMARY OF THE INVENTION

More particularly, the present invention aims to provide a bearing for a clutch release bearing device having a reduced number of components, which is easy to manufacture.

The present invention also seeks to provide a bearing having good operational reliability.

The bearing provides a first hearing ring, a second bearing ring and a wear ring fastened to the first bearing ring. The first bearing ring may be an inner ring or an outer ring of the bearing. The wear ring is provided with snap fitting means that cooperates with the first bearing ring, for axial retention of the wear ring relative to the first bearing ring. The first bearing ring has a protruding centering member which engages inside a complementarily shaped receiving recess of the wear ring, for the angular locking of the wear ring relative to the first bearing ring.

Providing snap fitting means on the wear ring ensures axial retention of the wear ring, without the use of additional holding elements, or gluing, or welding, or riveting or overmoulding on the ring. The attachment of the wear ring on the first bearing ring is made only by snap fitting. The snap fitting means of the wear ring is distinct from the receiving recess formed in the wear ring, within which the centering member of the first bearing ring engages. The bearing forms a unitary assembly that can be easily manufactured and assembled, stored and transported with a particularly low risk of accidental separation of its constituent parts.

Furthermore, the angular retention of the wear ring relative to the first bearing ring is achieved by the one or more centering members, each extending within an associated housing of the wear ring. The one or more centering elements constitute means for preventing rotation of the wear ring relative to the first bearing ring.

In a preferred embodiment, the one or more centering members are integrally formed with the first bearing ring. The centering members can be obtained by local deformation of the material of the first bearing ring.

Preferably, the one or more centering members protrude from an outer face of the first bearing ring against which the wear ring abuts in axial direction.

The receiving recess of the wear ring can advantageously be a blind recess. Thus, even if the one or more centering members provide a through hole, the wear ring ensures a tight sealing in the region of each centering member.

In one embodiment, the wear ring provides a body axially bearing against an outer face of the first bearing ring, and an annular centering portion which extends in an axially inward direction from the body and is provided with a radial contact surface for contacting a radial surface of the first bearing ring. The snap fitting means of the wear ring may extend from the annular centering portion.

In one embodiment, the snap fitting means of the wear ring extend in radial direction. The snap fitting means may provide at least one hook.

In one embodiment, the first bearing ring provides at least one complementary snap fitting means cooperating with the snap fitting means of the wear ring.

The invention also concerns an assembly comprising a bearing as defined above and an operating element supporting the bearing. The assembly may be a clutch release bearing device. The assembly may be a motor vehicle with the clutch release bearing device.

BRIEF DESCRIPTION OF THE DRAWINGS

The invention will be better understood from the following detailed description of embodiments representing non-limiting examples and illustrated by the accompanying drawings, wherein:

FIG. 1 is an axial sectional half-view of a rolling element bearing according to a first embodiment of the invention, FIG. 6 is a perspective view of a wear ring of the bearing of FIG. 5, and FIG. 7 is a perspective view of an outer ring of the bearing of FIG. 5.

DETAILED DESCRIPTION OF THE INVENTION

Figure 3:
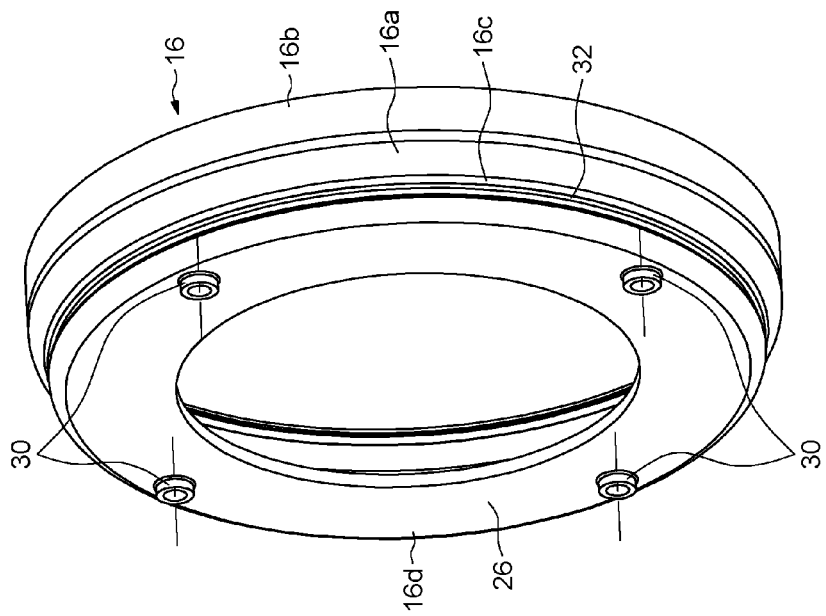
FIG. 3 is a perspective view of an outer ring of the bearing of FIG. 1.

In FIG. 1, a rolling element bearing, referenced 10 as a whole, for use in a clutch release bearing device is provided to act on the diaphragm 12 of a clutch, in particular for a motor vehicle. In the figure, the diaphragm 12 is partially illustrated and shown in dotted lines.

The diaphragm 12 provides a plurality of fingers 12a spaced apart from each other in circumferential direction. The rolling element bearing 10 is intended to be mounted on an operating element (not shown) of the associated clutch release bearing device and is adapted to move axially.

The hearing 10 has a rotation axis 10a, and provides a non-rotating inner ring 14, a rotating outer ring 16, a row of rolling elements 18, here made in the form of balls, and disposed radially between raceways formed on the hearing rings. The bearing 10 further includes a cage 20 for maintaining a regular circumferential spacing of the rolling elements 18, and an annular seal 22 secured to the outer ring. A rolling space (not referenced) is delimited radially between the inner 14 and outer 16 rings. The rolling elements 18 and the associated retention cage 20 are accommodated inside the rolling space.

As will be described in more detail below, the hearing 10 further provides a wear ring 24 attached to the outer ring 16 and adapted to come into contact axially against the diaphragm 12 of the clutch.

The inner ring 14 is thin-walled, and can advantageously be made by pressing of a metal sheet, for example sheet steel. The inner ring 14 is made in one piece. The inner ring 14 provides a toroidal portion 14a forming the inner raceway for the rolling elements 18. The inner ring 14 also includes an annular axial portion 14b extending in an axially inward direction from a large-diameter edge of the toroidal portion 14a, The inner ring 14 further includes an annular radial portion 14c extending in a radially inward direction from a small-diameter edge of the toroidal portion 14a.

The outer ring 16 is thin-walled, and can also be advantageously made by pressing of a metal sheet, for example made of sheet steel. The outer ring 16 is made in one piece. The outer ring 16 provides a toroidal portion 16a forming the outer raceway for the rolling elements 18. The outer ring further includes first and second axial portions 16b, 16c, extending axially from either axial side of the toroidal portion 16a, The first axial portion 16b extends from a large-diameter edge of the toroidal portion 16a and radially surrounds the toroidal portion 14a of the inner ring. The second axial portion 16c extends from a small-diameter edge of the toroidal portion 16a, in opposite axial direction from the first axial portion 16b, The outer ring 16 also includes an annular radial portion 16d that extends in a radially inward direction from the second axial portion 16c.

The outer ring 16 has an outer face 26 which is oriented outwardly of the bearing, i.e. on the opposite side of the rolling elements 18, and against which the wear ring 24 bears. The outer face 26 is formed by the outer surface of portions 16a to 16c of the outer ring and an end face of the radial portion 16d which is oriented towards the diaphragm 12. The outer ring 16 also provides an inner face 28 which is oriented towards the inside of the bearing, i.e. the side of the rolling elements 18. The outer 26 and internal 28 faces define the thickness of the outer ring. The inner face 28, opposite the outer face 26, is formed by the bore portions 16a to 16c of the outer ring and the end face of the radial portion 16d which is directed towards the rolling elements 18.

The outer ring 16 also provides a plurality of centering studs 30 (FIG. 3) projecting in an axially outward direction, i.e. at the side opposite to the rolling space. The centering studs 30 extend towards the wear ring 24 and are formed on the outer ring 16. The studs 30 are formed on the outer face 26 of the outer ring. The studs 30 extend axially outwardly from the outer face 26. In the embodiment shown, the centering studs 30 are formed on the radial portion 16d of the outer ring and extend outwardly from the outer face region 26 formed by an end surface of the radial portion 16d which is oriented towards the diaphragm 12. The studs 30 are identical. The studs 30 are circumferentially spaced relative to each other, with an even spacing in the depicted example. Four studs 30 are provided in this example, although the number may also be for example one, two or three or five or more. Each stud 30 extends over a defined angular sector, for example between 5° and 10°.

In the embodiment shown, the studs 30 have a cylindrical shape and provide a through recess. Alternatively, the studs 30 can have other shapes, e.g. polygonal such as square, rectangular, etc. and may or may not have a through recess.

The studs 30 are formed on the outer ring 16 by plastic deformation of the material, so as to cause locally on the outer face 26 an outward flow of material with material removal. Studs 30 are obtained by local plastic deformation of the outer ring 16. The studs 30 are integrally formed with the outer ring, i.e. from the same material.

The outer ring 16 further provides an annular groove 32 made on the outer face 26 of the outer ring. In the depicted embodiment, the groove 32 is directed radially outwardly and is formed on the second axial portion 16c of the outer ring. The studs 30 and the groove 32 are preferably formed during stamping operations designed to obtain the outer ring 16.

The seal 22 is fixed to the outer ring 16 and is in dynamic sealing contact with the inner ring 14. The term "dynamic sealing" means a seal between two parts having a relative movement. The seal 22 is here fixed in the bore of the first axial portion 16b of the outer ring and bears against the outer surface of the axial portion 14b of the inner ring.

The wear ring 24 is suitable for contacting engagement with the diaphragm 12. The wear ring 24 is a single piece formed from a synthetic material. Preferably, the wear ring 24 is obtained by molding. As an indication, the wear ring 24 may be made for example of polyamide with or without mineral or carbon fibers.

The wear ring 24 includes an annular body 24a bearing axially against the outer face 26 of the outer ring 16. The body 24a partially covers the outer face 26. In the embodiment shown, the body portion 24a covers the radial portion 16d of the outer ring on the outside of the bearing. The body 24a defines an engagement surface 34 or an outer frontal support arranged to cooperate axially in contact with the fingers of the diaphragm 12a, The diaphragm 12 abuts against the body 24a of the wear ring axially on the opposite side to the outer ring 16. The body 24a defines an internal mounting surface 36, opposite from the engagement surface 34, which contacts the outer face 26 of the outer ring 16. The engagement surface 34 and mounting surface 36 define the thickness of the body 24a.

The wear ring 24 also includes an annular centering portion 24b which extends from the body 24a and is adapted to ensure the centering of the wear ring relative to the outer ring 16. The centering portion 24b extends axially from the body 24a in the direction of the outer ring 16. The centering portion 24b extends from a large-diameter edge of the body 24a, The centering portion 24b moves to center itself on the outer face 26 of the outer ring. The centering portion 24b has an inner surface in radial contact with the outer surface 26. The centering portion 24b radially surrounds the axial portion 16c of the outer ring.

The wear ring 24 further provides an annular hook 40 extending from the centering portion 24b in a radially inward direction. The hook 40 extends from the inner surface of the centering portion 24b, The hook 40 protrudes into the groove 32 of the outer ring. The hook 40 is formed integrally with the wear ring 24.

The hook 40 forms snap fitting means which cooperates with complementary snap fitting means of the outer ring, formed by the groove 32, to ensure axial retention of the wear ring 24 on the outer ring 16. The axial fastening of the ring wear 24 and the outer ring 16 is effectively performed by snap fittings means which are made of a rigid material.

The fastening of the wear ring 24 on the outer ring 16 is achieved simply by pressing in axial direction. In the illustrated embodiment, the wear ring 24 includes a single annular hook 40, i.e. continuous in the circumferential direction. Alternatively, the wear ring 24 may include a plurality of hooks spaced apart from each other in the circumferential direction engaging within the groove 32 of the outer ring, or each engaging inside a specific notch or slot of the ring.

In the embodiment described, the hooks of the wear ring 24 cooperate with a groove or notches formed on the outer ring to ensure the axial retention of the wear ring on the outer ring. Alternatively, the hooks or the wear ring 24 can cooperate with an annular boss or bosses spaced in the circumferential direction, formed on the outer face of the outer ring and projecting outwardly with respect to the face. In this case, the one or more bosses of the outer ring form a complementary snap fitting means cooperating with the snap fitting means of the wear ring. In another variant, the outer ring is not provided with snap fitting means of complementary shape. It is for example possible to provide the outer ring with a conical-shaped hooking region widening towards the wear ring to cooperate with the snap fitting means of the wear ring.

Figure 2:
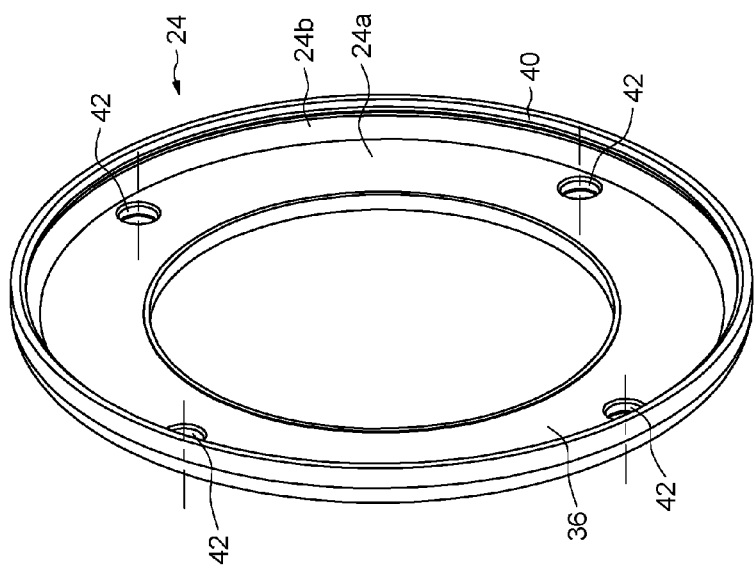
FIG. 2 is a perspective view of a wear ring of the bearing of FIG. 1.

The wear ring 24 also includes a plurality of receiving recesses 42 (FIG. 2) within each of which one of the centering studs 30 of the outer ring engages. Each stud 30 extends within its associated receiving recess 42. The recesses 42 are identical. Each receiving recess 42 has a complementary shape to its associated centering stud. A slight assembly clearance is provided between the receiving recess 42 and its associated stud 30. The number of recesses 42 is equal to the number of studs 30 of the outer ring 16. Each receiving recess 42 extends from the mounting surface 36 of the wear ring in an axially outward direction, away from the rolling elements 18. Each receiving recess 42 extends into the thickness of the wear ring 24, without penetrating through. The angular locking of the wear ring 24 relative to the outer ring is obtained by the cooperation of the recesses 42 with the studs 30. The studs 30 of the outer ring form anti-rotation means of the wear ring cooperating with complementary anti-rotation means of the wear ring formed by the recesses 42.

Figure 4:
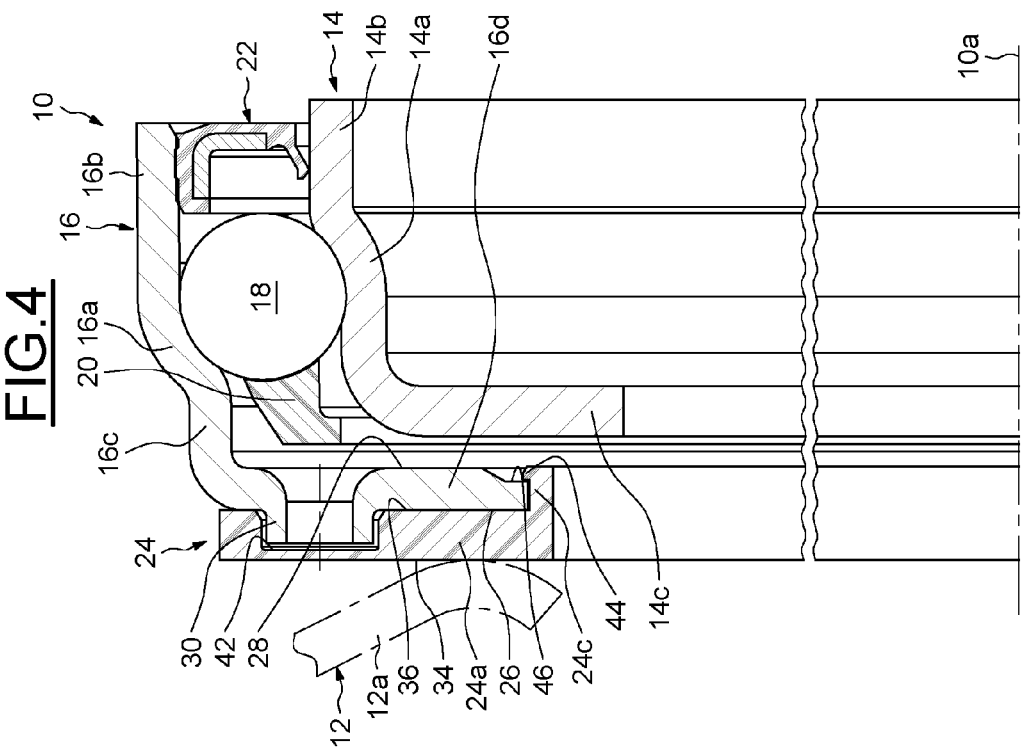
FIG. 4 is an axial sectional half-view of a rolling element bearing according to a second embodiment of the invention.

The embodiment shown in FIG. 4, in which the identical elements bear the same references, primarily differs from the first example described above in that the wear ring 24 includes an annular inner centering portion 24c to ensure the centering of the wear ring relative to the outer ring 16. The wear ring 24 here has no external centering portion. The centering portion 24c extends axially inwardly from a small-diameter edge 26a of the body. The centering portion 24c moves to center itself in the bore of the outer ring 16. The centering portion 24c has an outer surface in contact with the radial bore. The centering portion 24c is mounted in the bore of the radial portion 16d of the outer ring.

The wear ring 24 also provides an annular hook 44 extending radially from the centering portion 24c, The hook 44 extends from the outer surface of the centering portion 24c. The hook 44 extends from the free end of the centering portion 24c, The hook 44 is formed integrally with the wear ring 24.

In this embodiment, the outer ring 16 provides a notch 46 formed on the inner face 28. The notch 46 is formed on the radial portion 16d of the outer ring. The notch 46 extends from the inner face 28 of the outer ring. The notch 46 extends into the thickness of the outer ring, without reaching the external face 26 on the opposite side. The notch 46 extends here in the axial thickness of the outer ring 16. The notch 46 does not penetrate through the thickness of the outer ring 16. The notch 46 may be formed for example by spot facing.

The hook 44 of the wear ring engages within the notch 46 and abuts axially against the bottom of the notch to ensure the axial retention of the wear ring 24 on the outer ring 16. This limits the portion of the hook 44 projecting from the inner face 28 of the outer ring. Alternatively, the wear ring 24 may include a plurality of hooks spaced apart from each other in the circumferential direction and extending within the notch 46 of the outer ring, or each extending within a specific notch formed on the inner face 28 of the ring. In another alternative embodiment, the outer ring may be devoid of notches. In this case, the snap fitting means of the wear ring 24 cooperates with the free end of the radial portion 16d of the outer ring with no provision of specific complementary snap fitting means on the outer ring.

Figure 5:
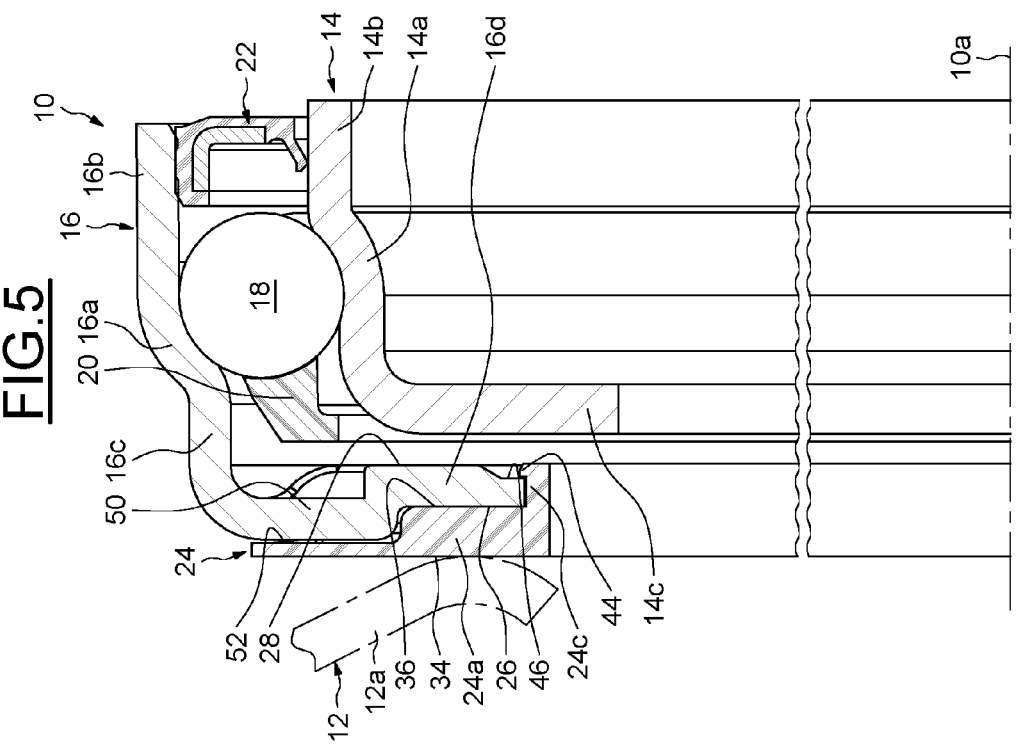
FIG. 5 is an axial sectional half-view of a rolling element bearing according to a third embodiment of the invention.

In the embodiments described above, the outer ring 16 includes studs 30 for centering. Alternatively, it is possible to provide on the outer ring other types of projecting centering members to enable the angular retention of the wear ring 24. For example, the embodiment illustrated in FIGS. 5 to 7, on which the identical elements bear the same reference numbers, differs from the second example described above in that the outer ring 16 provides ribs or bosses 50 formed on the outer face 26 and projecting outwardly with respect to the face. The bosses 50 extend axially. The bosses 50 are formed by axial plastic deformation of material, without removal of material, so as to locally cause a material flow radially outwardly. The bosses 50 are obtained by local plastic deformation of the outer face 26 of the outer ring. The projections 50 are integral with the outer ring 16. The arrangement of bosses 50 on the outer ring 16 is similar to that of the centering studs of the preceding embodiment examples. In this embodiment, the outer ring 16 has an increased rigidity in view of the additive axial flange portion provided on the radial portion 16d of the ring.

The wear ring 24 provides a plurality of identical receiving recesses 52 inside each of which a centering boss 50 of the outer ring engages. Each boss 50 extends inside the associated receiving recess 52, which is complementarily shaped. Each recess 52 extends from the mounting surface 36 of the wear ring. Each recess 52 extends axially and is directed axially away from the side of the outer ring 16. Each receiving recess 52 extends in the thickness of the wear ring 24 without penetrating through, i.e. blindly. The angular locking of the wear ring 24 relative to the outer ring is obtained by the cooperation of recesses 52 with the centering bosses 50. In this embodiment, unlike the previous embodiments, each receiving recess 52 is open radially on the outside.

In the embodiments shown, the wear ring 24 is fixed on the outer ring 16 via a snap fit either on the outer surface of this ring or on its inner bore. Alternatively, it could be possible to provide a wear ring comprising both first snap fitting means for fastening on the outer surface of the outer ring and second snap fitting means for fastening into the bore of the ring.

In the embodiments shown, the centering members 30, 50 of the outer ring provided are formed on the radial portion 16*d* of the outer ring. Alternatively, it could be possible to provide centering elements arranged in other areas of the outer ring 16, for example on the axial portion 16*c*, In this case, the centering members protrude radially outwardly.

In the embodiments shown, the centering means of the outer ring are integrally formed with the ring. This arrangement is advantageous insofar as it helps to stiffen the outer ring. Alternatively, it is possible to provide centering elements on the outer ring 16 which are formed separately and then attached to the ring by any suitable means.

The invention has been illustrated on the basis of a bearing wherein the wear ring is snap-fitted on the outer ring. Alternatively, the wear ring may be snap-fitted on the inner ring when the inner ring is designed to be the rotating ring of the bearing. The invention has been illustrated on the basis of a rolling bearing provided with at least one row of rolling elements arranged between the inner and outer rings. Alternatively, the bearing may be a plain bearing or a ball joint.

The invention claimed is:

1. A bearing comprising:
a first bearing ring,
a second bearing ring, and
a wear ring fastened to the first bearing ring, wherein the wear ring is provided with snap fitting means cooperating with the first bearing ring for axial retention of the wear ring relative to the first bearing ring, and wherein the first bearing ring provides at least one centering member projecting into and engaging within a receiving recess of complementary shape provided in the wear ring, for angular locking of the wear ring relative to the first bearing ring, wherein the wear ring further comprises a body bearing axially against an outer face of the first bearing ring, and an annular centering portion extending axially inwards from the body and provided with a radial contact surface with the first bearing ring.

2. The bearing according to claim 1, wherein the centering member is integrally formed with the first bearing ring.

3. The bearing according to claim 2, wherein the centering member is obtained by local deformation of the material of the first bearing ring.

4. The bearing according to claim 1, wherein the centering member extends from an outer face of the first bearing ring against which the wear ring abuts in axial direction.

5. The bearing according to claim 1, wherein the receiving recess provided in the wear ring is a blind recess.

6. The bearing of claim 1, wherein the snap fitting means of the wear ring extends from the centering portion.

7. The bearing according to claim 1, wherein the first bearing ring further comprises complementary snap fitting means cooperating with the snap fitting means of the wear ring.

8. The bearing according to claim 1, wherein the snap fitting means of the wear ring further comprises at least one hook.

9. The bearing according to claim 1, wherein the first bearing ring is an outer ring of the bearing.

* * * * *